United States Patent
Qi et al.

(10) Patent No.: US 8,127,165 B2
(45) Date of Patent: Feb. 28, 2012

(54) MULTIPATH POWER MANAGEMENT

(75) Inventors: Yanling Qi, Austin, TX (US); Kevin Copas, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 508 days.

(21) Appl. No.: 12/366,551

(22) Filed: Feb. 5, 2009

(65) Prior Publication Data

US 2010/0199116 A1    Aug. 5, 2010

(51) Int. Cl.
*G06F 1/00*    (2006.01)
*G06F 1/32*    (2006.01)

(52) U.S. Cl. ........................................ 713/324; 713/320

(58) Field of Classification Search .................. 713/300, 713/320, 322, 323, 324; 710/2, 14, 18, 29, 710/33–34, 58, 60, 316
See application file for complete search history.

(56) References Cited

U.S. PATENT DOCUMENTS

| | | | | |
|---|---|---|---|---|
| 6,959,395 | B2 * | 10/2005 | Ma | 713/310 |
| 2004/0213171 | A1 * | 10/2004 | Edmon et al. | 370/282 |
| 2008/0126525 | A1 * | 5/2008 | Ueoka et al. | 709/223 |
| 2008/0235528 | A1 * | 9/2008 | Kim et al. | 713/324 |
| 2009/0055666 | A1 * | 2/2009 | Yee | 713/320 |
| 2010/0057948 | A1 * | 3/2010 | Hemmi et al. | 710/20 |

OTHER PUBLICATIONS

Patterson, David A., et al. "A Case for Redundant Arrays of Inexpensive Disks (RAID)". EECS Department, University of California, Berkeley. Dec. 1987. pp. 1-24.*

* cited by examiner

*Primary Examiner* — Thomas J Cleary

(74) *Attorney, Agent, or Firm* — Alexander J. Neudeck; Cochran Freund & Young LLC (57) ABSTRACT

Disclosed is a method of controlling power. Multiple paths via multiple I/O ports couple a server to a storage array. When I/O loads are low, it is determined if an I/O port may be deactivated and placed in a power saving mode. An I/O port may not be deactivated if deactivating that I/O port will affect a high-availability requirement or a performance requirement. Requests are stopped from being sent to an I/O port to be deactivated. When the port to be deactivated becomes idle, the I/O port is placed in a power saving mode. When I/O loads increase to a point where it is necessary to reactivate the I/O port, the I/O port is activated.

16 Claims, 7 Drawing Sheets

MULTIPATH POWER MANAGEMENT

BACKGROUND OF THE INVENTION

Mass storage and server systems continue to provide increased compute capacities to satisfy user demands. Photo and movie storage, and photo and movie sharing are examples of applications that fuel the growth in demand for larger, faster, and more reliable storage systems.

Part of a solution to these increasing demands is the use of arrays of multiple inexpensive disks. These arrays may be configured in ways that provide redundancy and error recovery without any loss of data. These arrays may also be configured to increase read and write performance. This may be accomplished by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems may be connected to a host server system using multiple connections. These multiple connections provide redundancy which can ensure a high level of reliability. The multiple connections may also provide fast access and data transfer between the RAID system and the host server. Software in the server may be configured so that the storage array appears as one or more disk drives (or volumes). This is accomplished in spite of the fact that the data (or redundant data) for a particular volume may be spread across multiple disk drives or RAID systems.

SUMMARY OF THE INVENTION

An embodiment of the invention may therefore comprise a method of controlling power, comprising: communicating with an external device via at least a first I/O port and a second I/O port; determining that a usage indicator associated with at least the first I/O port and the second I/O port satisfies a first usage criteria; in response to the usage indicator satisfying the first usage criteria, determining that the first I/O port may be deactivated; and, deactivating the first I/O port.

An embodiment of the invention may therefore further comprise a power saving system, comprising: a plurality of I/O ports coupled via a plurality of paths to an external I/O device, the plurality of I/O ports comprising a first I/O port and a second I/O port; a multi-path manager that routes I/O requests to at least the first I/O port and the second I/O port; a power manager monitoring a total I/O bandwidth associated with the plurality of I/O ports, the power manager instructing the multi-path manager to stop routing I/O requests to the first I/O port in response to the total I/O bandwidth satisfying a bandwidth criteria; and, an I/O port manager that, in response to the first I/O port becoming idle, instructs the first I/O port to enter a power saving mode.

DETAILED DESCRIPTION OF THE EMBODIMENTS

Figure 1:
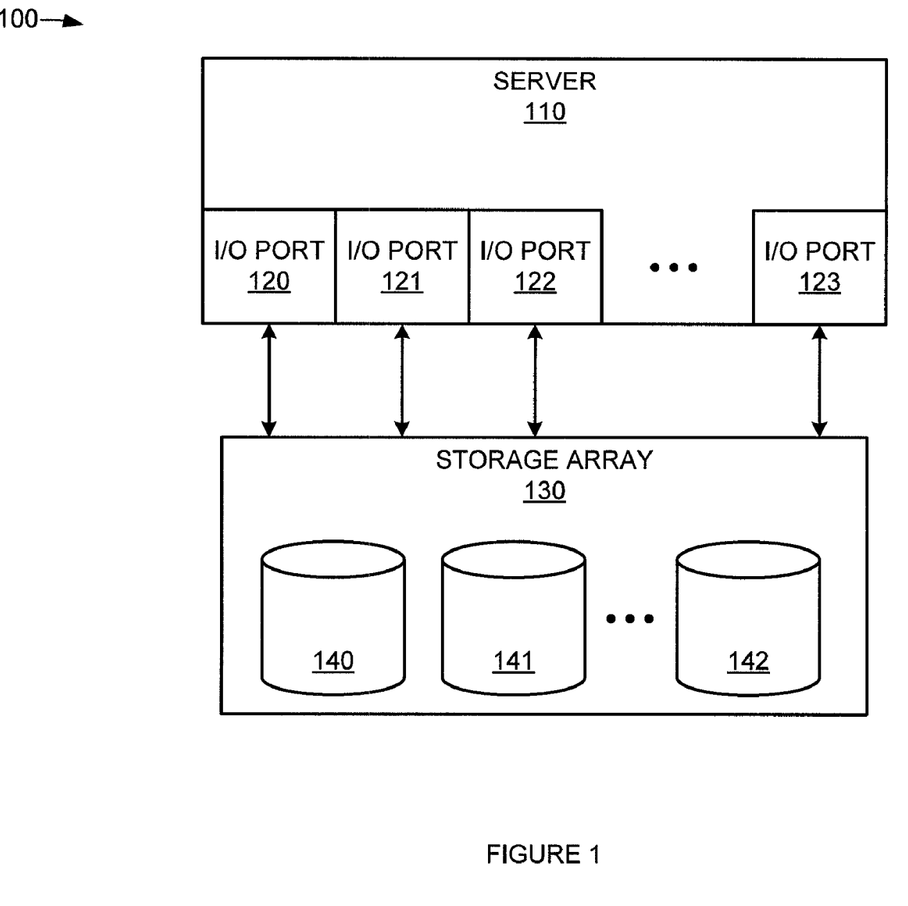
FIG. 1 is a block diagram of a multipath I/O server configuration.

FIG. 1 is a block diagram of a multipath I/O server configuration. In FIG. 1 multipath server configuration 100 comprises server 110 and storage array 130. Server 110 includes I/O ports 120-123. Storage array 130 includes disk drives 140-142. Server 110 is operatively coupled to storage array 130 via I/O ports 120-123 and multiple paths. Thus, server 110 may access data stored by storage array 130. This data may be exchanged with storage array 130 via multiple paths in order to provide for high-availability or for increased bandwidth.

Figure 2:
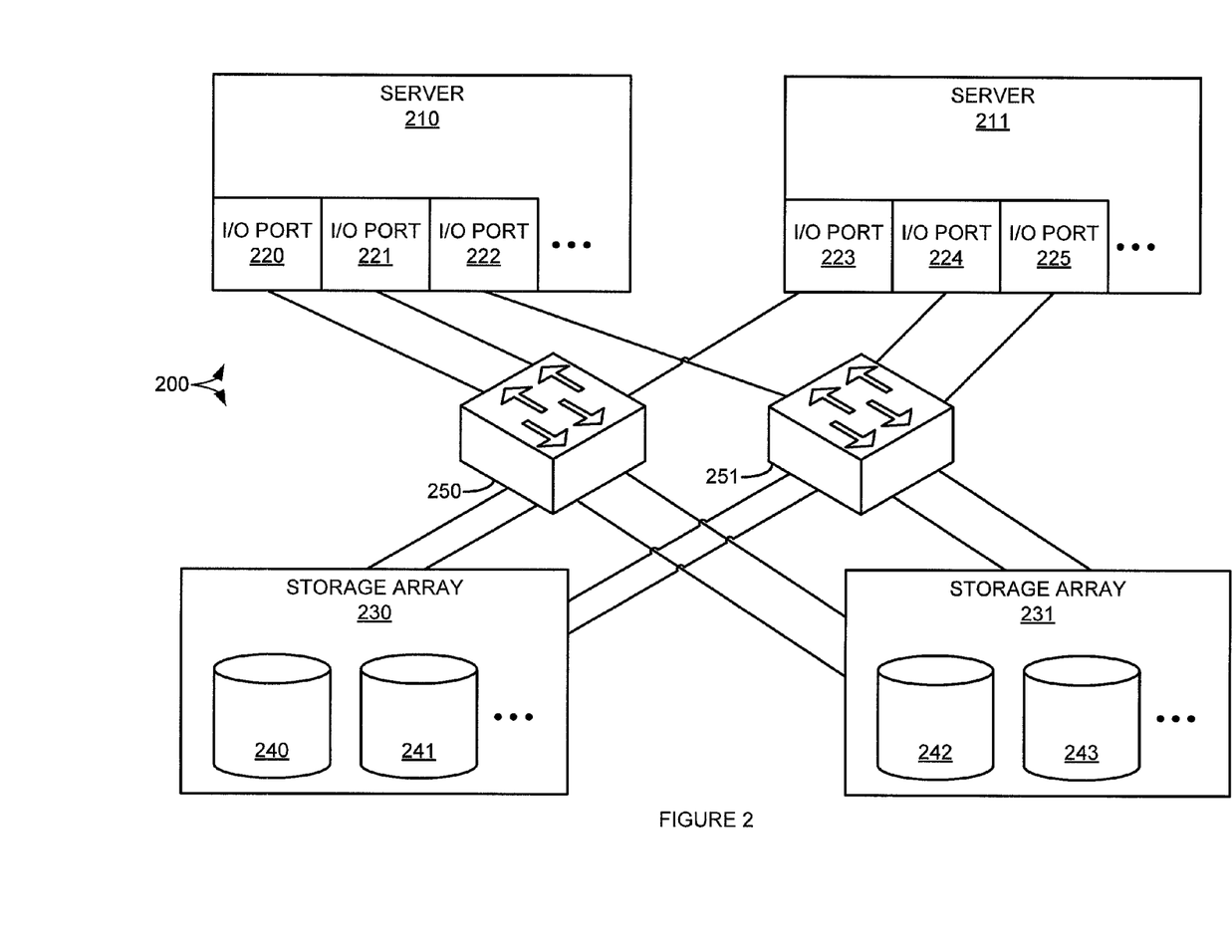
FIG. 2 is a block diagram of a multipath I/O server configuration.

FIG. 2 is a block diagram of a multipath I/O server configuration. In FIG. 2 multipath server configuration 200 comprises server 210, server 211, storage array 230, storage array 231, switch 250, and switch 251. Server 210 includes I/O ports 220-223. Server 211 includes I/O ports 223-225. Storage array 230 includes disk drives 240-241. Storage array 231 includes disk drives 242-243.

Server 210 is operatively coupled to switch 250 via I/O ports 220 and 221. Server 210 is operatively coupled to switch 251 via I/O port 222. Switch 250 is operatively coupled to storage array 230 and storage array 231 via multiple paths. Switch 251 is operatively coupled to storage array 230 and storage array 231 via multiple paths. Thus, server 210 may exchange I/O data with storage array 230 and storage array 231 via switch 250 or switch 251 and multiple paths. These multiple paths may provide for high-availability or increased bandwidth.

Server 211 is operatively coupled to switch 250 via I/O port 223. Server 211 is operatively coupled to switch 251 via I/O ports 224 and 225. Thus, server 211 may exchange I/O data with storage array 230 and storage array 231 via switch 250 or switch 251 and multiple paths. These multiple paths may provide for high-availability or increased bandwidth.

In an embodiment, I/O ports 120-123 and 220-225 could be Fiber Channel, high speed Ethernet network interfaces, InfiniBand, or Serial Attached SCSI (SAS). Storage arrays 130 and 230-231 may have dual or multiple controllers (or data process units) for high availability. Each controller may have multiple target I/O ports to provide high I/O bandwidth.

The power consumption of I/O ports 120-123 and 220-225 may vary according to transport technologies and transport speed. Table 1 lists exemplary power consumption per I/O port for different data transport technologies.

TABLE 1

| I/O port type | Power Consumption |
| --- | --- |
| 4 Gb FiberChannel | 3-5 watts per port |
| 10 Gb Ethernet | 9 watts per port |
| Gigabit Ethernet | 4 watts per port |
| Infiniband | 1.5 watts per port |
| Serial Attached SCSI | 1.2 watts per PHY |

Figure 3:
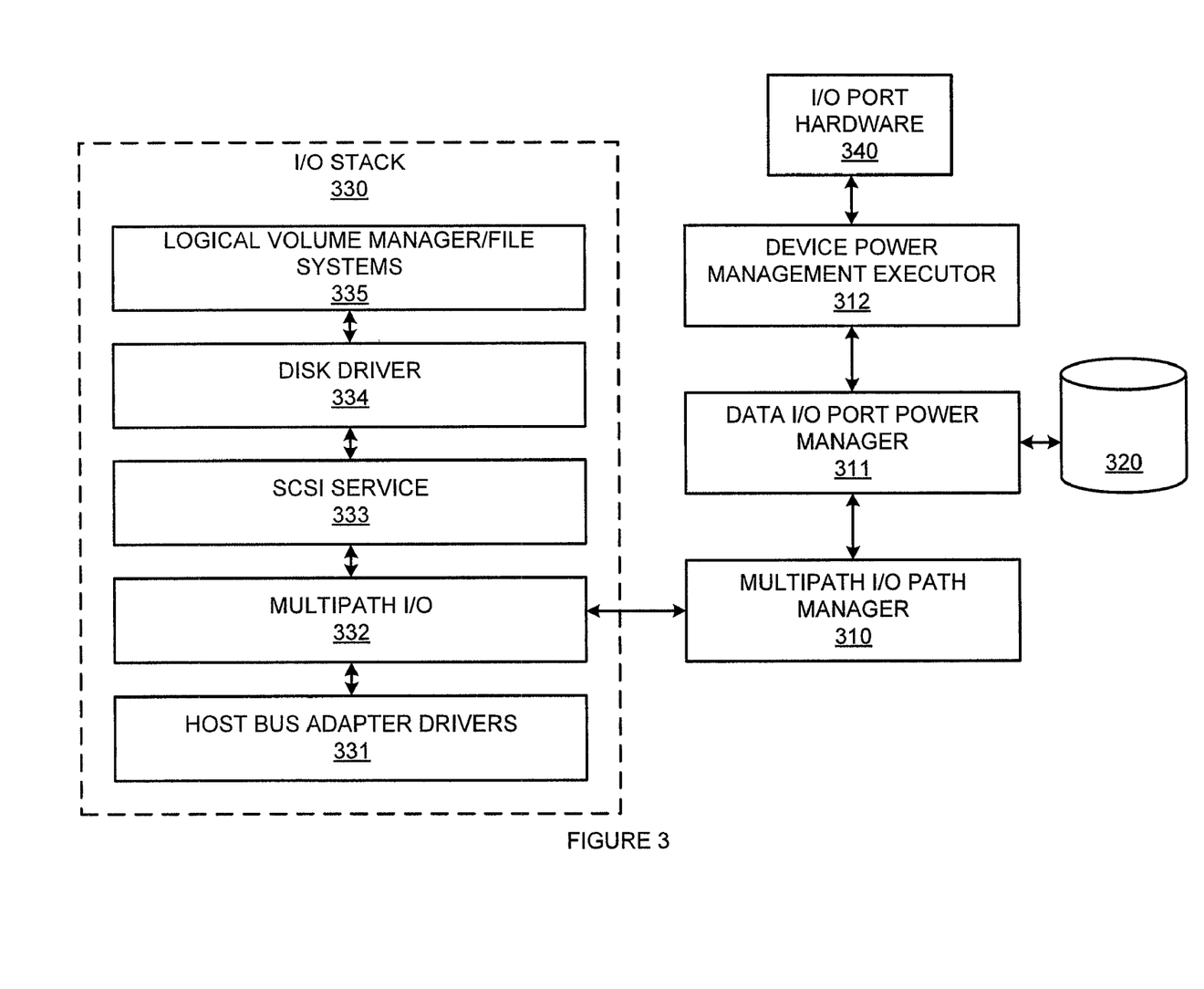
FIG. 3 is a block diagram of software components to manage I/O port power.

In an embodiment, server 110 and servers 210-211 may include software components to manage I/O port power and thus conserve power at times of low I/O load. These components are illustrated in FIG. 3. FIG. 3 is a block diagram of software components to manage I/O port power. In FIG. 3, an operating system I/O stack 330 includes (from the lowest layer to the highest) host bust adapter drivers (HBA) 331, multipath I/O layer 332, SCSI service 333, disk driver 334, and logical volume manager/file system layer 335.

In FIG. 3, multipath I/O layer 332 is also operatively coupled to multipath I/O path manager 310. Multipath I/O path manager 310 is operatively coupled to data I/O port power manager 311. Data I/O port power manager 311 is operatively coupled to persistent store 320 and device power management executor 312. Device power management executor 312 is operatively coupled to I/O port hardware 340.

The software components of server 110 and servers 210-211 to manage I/O port power include multipath I/O path manager 310, data I/O port power manager 311, and device power management executor 312. Data I/O port power manager 311 is the command center. Data I/O port power manager 311 collects I/O port 120-123 220-225 configuration information, samples current server I/O loads, coordinates management activities and directs the device power management executor 312 to switch I/O ports 120-123 220-225 to different power states.

The multipath I/O path manager 310 understands the storage device topology. The multipath I/O path manager 310 responds data I/O port power manager 311's requests to determine whether or not an I/O port 120-123 220-225 can be moved to power off or power saving mode without affecting device accessibility and data-access high availability. Meanwhile, if an unexpected data path failure causes the loss of data access high availability, the multipath I/O path manager 310 will send feedback to the data I/O port power manager to move one or more I/O ports 120-123 220-225 to power on mode so that data-access high availability may be maintained.

In an embodiment, I/O ports 120-123 220-225 are PCI functions (devices). All PCI devices are required to implement the PCI Bus Power Management Interface Specification from PCI-SIG (Peripheral Component Interconnect Special Interesting Group). Modem operating systems may provide management interfaces to manage PCI device power states. The device power management executor 312 will accept management commands from the data I/O port power manager 311 and execute the command to modify an I/O port 120-123 220-225 power state.

In FIG. 3, the multipath I/O layer 332 is shown located between the SCSI service layer 333 and the HBA drivers 331. However, it should be understood that the multipath I/O layer 332 may reside at, or interact with, different layers. For example, a Linux device mapper multipathing solution places multipath I/O layer 332 on the top of disk driver 334. In another example, an implementation may take the approach to integrate the multipath I/O layer 332 into logical volume manager/file system layer 335. It should be understood that the methods and apparatus described herein applies to all different architecture models of multipath I/O solutions.

In an embodiment, data I/O port power manager 311 may continuously sample server I/O loads. An operating system provides user space access to disk I/O statistics. For instance, Linux operating system exports real-time disk I/O statistics through /proc/diskstats file and attribute files of sysfs file system. The /proc/diskstats and sysfs provide the number of read/write I/O requests and the number of read/write block accesses of each block disk device.

In another example, Windows operating systems provides a performance counter library. A user space program can access performance counter library through WMI (windows management instrumentation) API or Pdh.dll (performance data helper). The data I/O port power manager 311 may sample I/O loads periodically via the aforementioned operating system interfaces. When the data I/O port power manager 311 samples the server I/O loads, it may only report the I/O loads associated with storage arrays 130, or 230-231 and exclude I/O loads of storage devices with only single data access path.

Data I/O port power manager 311 may build up an I/O port configuration database. This database may be stored on persistent store 320. The database may be built up during the system boot time and updated when new I/O port 120-123 220-225 hardware is dynamically added to the server. The data base may contain PCI addresses of each configured I/O port 120-123 and 220-225 and associated operating system device name for the management of the device's power management functions. For example, Windows 2008/Vista provides power management APIs for an application to query device supported power state and to manage the device's power state. In another example, in a Linux system, a device's power state can be managed through device's sysfs power attributes.

The data base may also contain indicators of each I/O ports 120-123 220-225 bandwidth and its power states. An I/O port 120-123 220-225 may have a maximum supported bandwidth and a current active bandwidth. For instance, an 8 Gb fiber channel port is capable to transmit data at the rate of 8 Gb per second. But it may be actively configured at the rate of 4 Gb per second because of a connectivity component's speed limitation. The PCI-SIG (Peripheral Component Interconnect Special Interest Group) PCI power management interface specification details the PCI function (device) power state and state transition model.

The database may also contain power management policies and policy configuration. For example, PCI-SIG PCI power management interface specification details the PCI function (device) power state and state transition model. Details of power management policies may also be stored. These details may include one or more thresholds for I/O load that determine if a port can be deactivated.

Data I/O port power manager 311 has access to the power management policies stored on persistent store 320. These policies may correspond to the policies shown in Table 2.

TABLE 2

| Power Saving Policy | Parameter Values |
| --- | --- |
| Aggressive Power Saving Policy | $R_{TA} = R_{2A}$ |
| | $R_{TD} = R_{2D}$ |
| | $D_{TA} = T_{2A}$ |
| | $D_{TD} = T_{2D}$ |
| Moderate Power Saving Policy | $R_{TA} = R_{1A}$ |
| | $R_{TD} = R_{1D}$ |
| | $D_{TA} = T_{1A}$ |
| | $D_{TD} = T_{1D}$ |
| No Power Saving Policy | $D_{TD} = D_{TA} = $ infinity |

The power saving policies may be based on a threshold model. In the threshold model, as shown in Table 2, there are two variables R and t. R is defined as the ratio of current I/O loads to the current active I/O port bandwidth. The t is a time duration when R falls above or below a configured threshold value of $R_{TA}$ or $R_{TD}$ where: the subscripts TA and TD represent the thresholds for activating an I/O port 120-123 220-225 or deactivating an I/O port 120-123 220-225, respectively. The $D_T$ is the duration threshold. Based on this threshold model, data I/O port power manager 311 will take an action to deactivate one or more I/O ports 120-123 220-225 when $R<R_{TD}$ and $t>D_{TD}$. Similarly, data I/O port power manager 311 will take the action to activate one or more I/O port 120-123 220-225 if $R>R_{TA}$ and $t>D_{TA}$ In Table 2, three power saving policies are shown. When "No Power Saving Policy" is selected, the duration time threshold $D_{T\{A|B\}}$ is set to infinity so that no I/O port power management action will be taken. For "Moderate Power Saving Policy" and "Aggressive Power Saving Policy" are selected, the threshold values will be constants. By adjusting threshold values, different data I/O port power saving and I/O performance behaviors may be achieved. In general, $R_{2D}$ will be higher than $R_{1D}$ and $R_{2A}$ higher than $R_{1A}$. The threshold values of $R_{2A}$, $R_{2D}$, $T_{2A}$, $T_{2D}$, $R_{1A}$, $R_{1D}$, $T_{1A}$ and $T_{1D}$ are constants which are predefined in persistent data store 320.

When the I/O load is lower than the deactivating threshold value $R_{TD}$ for $D_{TD}$ time period, the data I/O port power manager 311 moves one or more I/O ports 120-123 and 220-225 to power saving mode. Similarly, when the I/O load is higher than the activating threshold value $R_{TA}$ for $D_{TA}$ time period, the data I/O port power manager 311 moves one or more I/O ports 120-123 220-225 to full power mode.

The multipath I/O path manager 310 accepts command requests from the data I/O port power manager 311. The multipath I/O path manager 310 also returns results of feedback requests to the data I/O port power manager 311. The multipath I/O path manager understands each storage device's connection topology.

For example, using SCSI terminology, each I/O port 120-123 220-225 may be a SCSI initiator. A data interface port on a storage array controller is a SCSI target. The storage unit on a storage array is called logical unit or LUN (for Logical Unit Number). A data path to a storage unit is called I_T_L nexus (for Initiator Target LUN). A "multipath I/O device" means a storage array logical unit that can be accessed through multiple I_T_L nexuses. Deactivating an I/O port 120-123 220-225 to the multipath I/O layers 332 means removing an I_T_L nexus whose initiator is identified by the I part of the I_T_L nexus.

The multipath I/O path manager 310 may take the following actions when it receives a power management command from the data I/O port power manager 311: (1) determine whether deactivating an initiator port affects data access high availability; (2) I/O performance may be optimized; (3) A preferred candidate initiator port may be recommended for deactivating; and, (4) I/O requests may be stopped from being routed to the data paths to be deactivated; and, (5) Data paths may be reactivated after an initiator port is reactivated.

A storage array 130 230-123 may have two controllers (or process units). When the multipath I/O path manager 310 evaluates the high-availability impact of deactivating an I/O port 120-123 220-225, the multipath I/O path manager 310 may make sure that after the specified I/O port 120-123 220-225 is deactivated, all virtual devices will still have at least one data path to each controller of storage array 130 230-123 so that data access high availability is not compromised.

Since a server 210 or 211 may attach to multiple storage arrays 230 and 231, the multipath I/O path manager 310 may recommend a different I/O port 220-225 for deactivating based on the number of data paths to each virtual devices and the I/O load of different virtual devices.

When a data path failure condition is detected by the multipath I/O path manager 310 and the condition affects data high availability of some devices, the multipath I/O path manager 310 may send a request to the data I/O port power manager 311 to request re-activating at least one I/O port 120-123 220-225 so that high availability may be regained.

The device power management executor 312 accepts commands from the data I/O port power manager 311 for deactivating or re-activating one or more I/O ports 120-123 220-225. I/O ports 120-123 220-225 may be on a server's 130 230-231 PCI bus. PCI-SIG has created a PCI power management interface specification. This specification defines four PCI function power states D0-D3. Operating systems may provide management interfaces for reporting and managing the PCI function power states. The states D0 and D3 states are required for all PCI functions. The D0 means a PCI function is in its full power state. The D3 state means that the PCI function is in its minimum powered state. The D1 and D2 states are not optimal. The state transitions of the PCI power management are given in the PCI bus power management interface specifications.

Operating system platform may provide device power management interfaces. For instance, the Windows 2008/Vista provides a power management API for applications to query device supported power states and manage device power state. On a Linux system, the power state of a device can be managed through a device's sysfs power attributes. The device power management executor 312 accepts device power management commands from the data I/O port power manager 311. These management commands may include the device name of an I/O port 120-123 220-225 and its new power state. After accepting a management commands, the executor will translate the management command to operating system specific procedures that set the data I/O port to the specified state.

Figure 4:
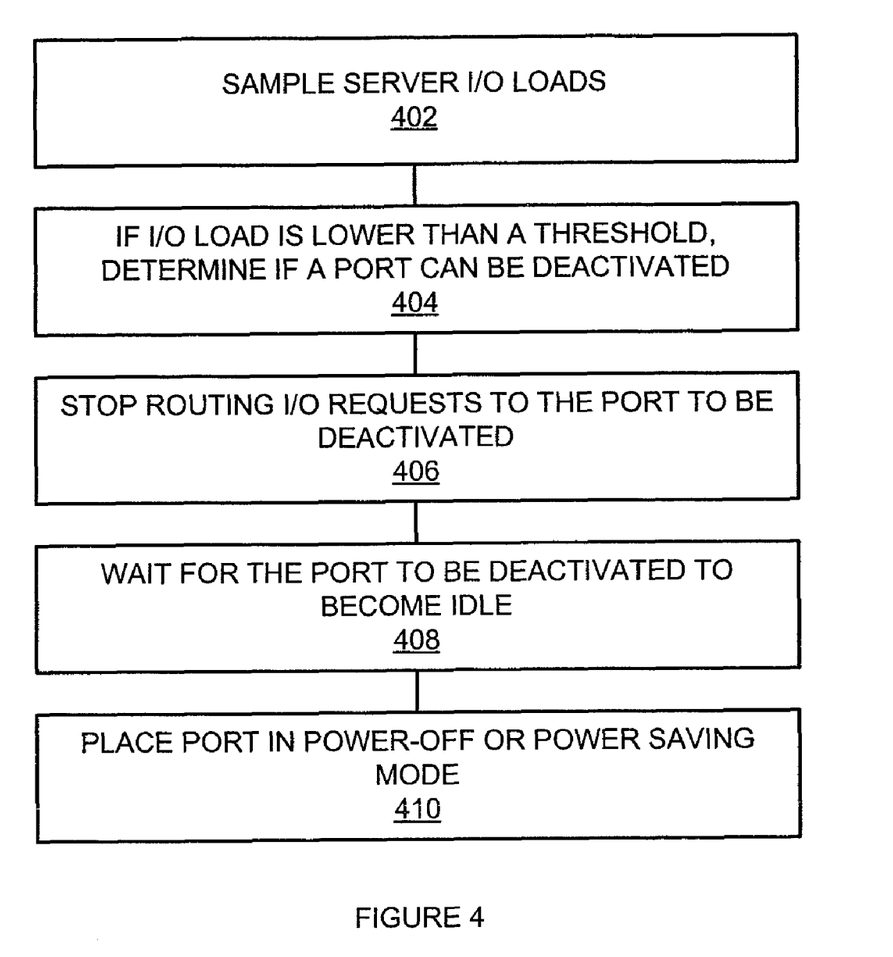
FIG. 4 is a flowchart of a method of controlling power.

FIG. 4 is a flowchart of a method of controlling power. The steps shown in FIG. 4 may be performed by one or more elements shown in FIGS. 1, 2 and 3. Server I/O loads are sampled (402). For example, data I/O port power manager 311 running on server 230 may sample the total I/O load of I/O ports 220-222. If the I/O load is lower than a threshold, it is determined if a port can be deactivated (404). For example, if the total I/O load of I/O ports 220-222 is lower than a threshold, then data I/O port power manager 311 may ask multipath I/O path manager 310 if I/O port 220 can be deactivated. In an embodiment, multipath I/O path manager 310 may respond by indicating "yes," "no," or "preferred no."

Routing I/O requests to the port to be deactivated is stopped (406). For example, data I/O port power manager 311 may command multipath I/O path manager 310 to stop routing requests to I/O port 220. Multipath I/O path manager 310 may stop routing request to I/O port 220. A wait until the port to be deactivated becomes idle is performed (408). For example, data I/O port power manager 311 may wait until I/O port 220 becomes idle. The port is placed in a power-off or power saving mode (410). For example, data I/O port power manager 311 may command the device power management executor 312 to place I/O port 220 in a power-off or power saving mode. Device power management executor 312 may place I/O port 220 in a PCI function power state that is not state D0.

Figure 5:
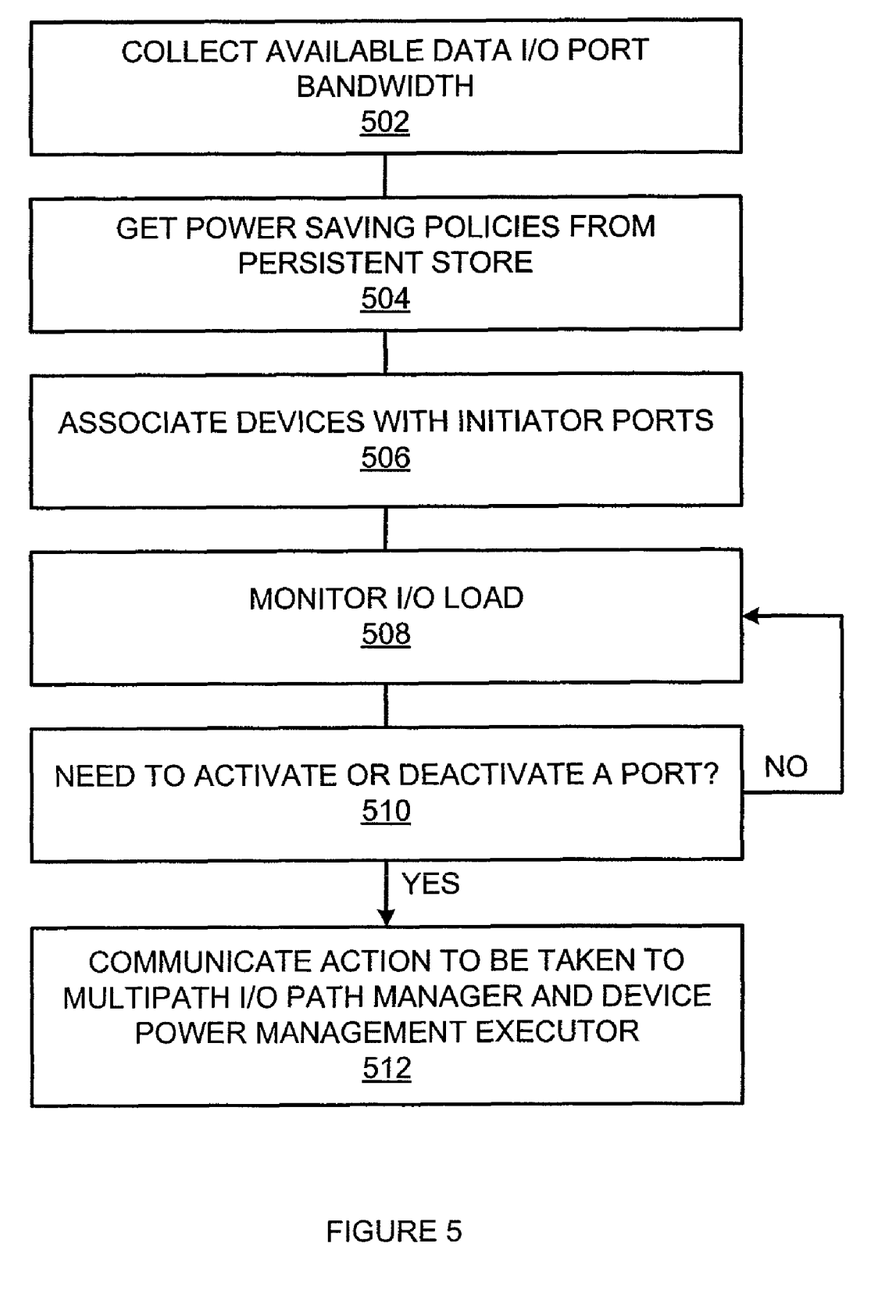
FIG. 5 is a flowchart of a method of determining when to save power.

FIG. 5 is a flowchart of a method of determining when to save power. The steps shown in FIG. 5 may be performed by one or more elements shown in FIGS. 1, 2 and 3. Available data I/O port bandwidth is collected (502). For example, data I/O port power manager 311 running on server 220 may collect available bandwidth associated with I/O ports 220-222. Power saving policies are gotten from persistent store (504). For example, data I/O port power manager 311 may retrieve power saving polices from persistent store 320.

Devices are associated with initiator ports (506). For example, data I/O port power manager 311 may associate individual LUNs with one or more I/O ports 220-222. I/O load is monitored (508). For example, data I/O port power manager 311 may sample the total I/O load of ports 220-222. If a port does not need to be activated or deactivated, flow proceed back to block 508. If a port needs to be activated or deactivated, flow proceeds to block 512 (510).

The action to be taken is communicated to the multipath I/O path manager and the device power management executor (512). For example, data I/O port power manager 311 may communicate, to multipath I/O path manager 310 and device power management executor 312, a series of commands that activate or deactivate I/O port 220.

Figure 6:
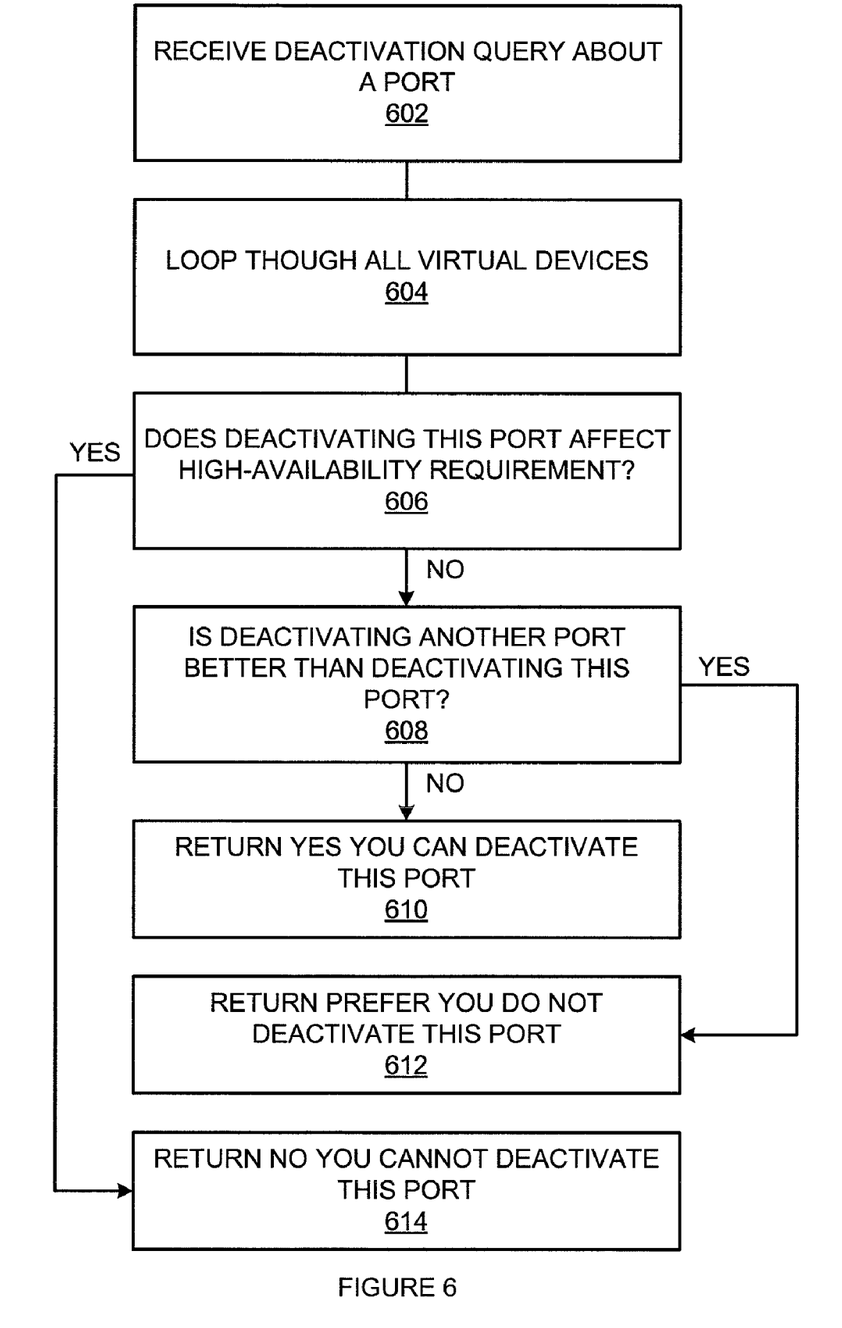
FIG. 6 is a flowchart of a method of selecting an I/O port to deactivate.

FIG. 6 is a flowchart of a method of selecting an I/O port to deactivate. The steps shown in FIG. 6 may be performed by one or more elements shown in FIGS. 1, 2 and 3. A deactivation query is received about a port (602). For example, multipath I/O path manager 310 may receive a query from data I/O port power manager 311 asking whether I/O port 220 may be deactivated. All virtual devices are looped through (604). For example, multipath I/O path manager 310 may loop through the virtual devices (LUNs) of server 210 to determine if deactivating I/O port 220 will affect a high-availability or minimum bandwidth requirement.

If deactivating this port affects a high-availability requirement, flow proceeds to block 614. If deactivating this port does not affect a high-availability requirement, flow proceeds to block 608 (606). If deactivating another port is better than deactivating this port, flow proceeds to block 612. If deactivating another port is not better than deactivating this port, flow proceeds to block 610. An indicator that this port can be deactivated is returned (610). For example, multipath I/O path manager 310 may return, to data I/O port power manager 311, an indicator that this port can be deactivated.

If deactivating this port would have affected a high-availability requirement, an indicator that this port cannot be deactivated is returned (614). For example, multipath I/O path manager 310 may return an indicator that this port cannot be deactivated to data I/O port power manager 311. If deactivating another port is better than deactivating this port, an indicator that it is preferred that this port not be deactivated is returned (612). For example, multipath I/O path manager 310 may return an indicator that it is preferred that this port not be deactivated to data I/O port power manager 311.

It should be understood that the foregoing description is in terms of server data I/O port power management. However, this invention also applies to other areas where multiple physical data paths are used for data communications. An example includes storage array controllers (RAID controllers) that perform I/O operations to disk drives. In this case, the storage array may accept server application I/O requests and then retrieve/save the I/O requests to its attached disk drives. For performance and high-availability purpose, the data paths between the RAID controller and the disk drives may be redundant. The above described I/O port power management architecture can be used for managing the data path power between the controller and a disk drive enclosure.

Another example involves multiple physical links. Some serial transport technologies, such as SAS and InfiniBand, have the concept of physical link and link aggregation. In this case, the server may have only one logical data I/O port but the logical connection between the server and its storage may contain multiple physical links (phys). In this case, the same power management architecture can be used to manage individual physical links for power saving purposes.

The methods, systems, networks, devices, equipment, and functions described above may be implemented with or executed by one or more computer systems. The methods described above may also be stored on a computer readable medium. Many of the elements of multipath server configuration 100 and multipath server configuration 200, may be, comprise, or include computers systems. This includes, but is not limited to server 110, storage array 130, includes I/O ports 120-123, disk drives 140-142, server 210, server 211, storage array 230, storage array 231, switch 250, switch 251, I/O ports 220-225, and disk drives 240-243.

Figure 7:
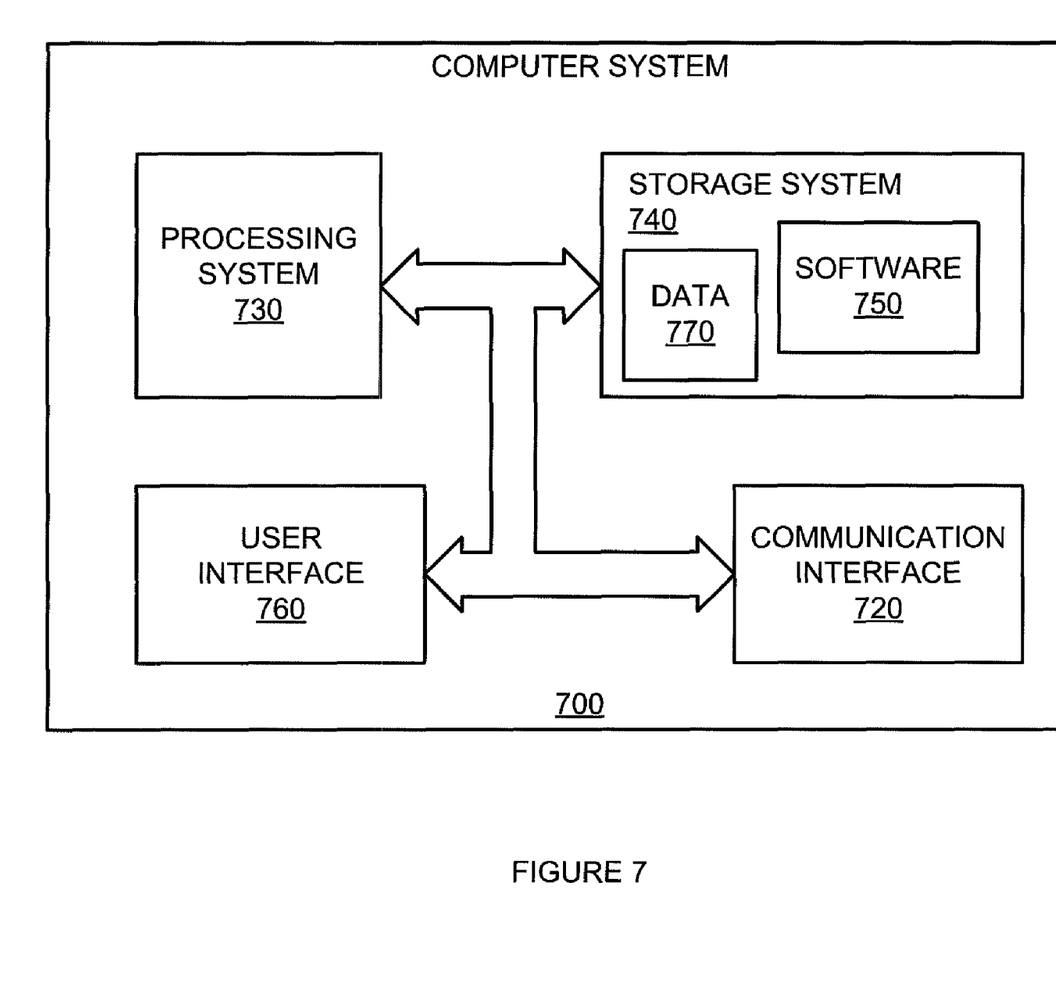
FIG. 7 is a block diagram of a computer system.

FIG. 7 illustrates a block diagram of a computer system. Computer system 700 includes communication interface 720, processing system 730, storage system 740, and user interface 760. Processing system 730 is operatively coupled to storage system 740. Storage system 740 stores software 750 and data 770. Processing system 730 is operatively coupled to communication interface 720 and user interface 760. Computer system 700 may comprise a programmed general-purpose computer. Computer system 700 may include a microprocessor. Computer system 700 may comprise programmable or special purpose circuitry. Computer system 700 may be distributed among multiple devices, processors, storage, and/or interfaces that together comprise elements 720-770.

Communication interface 720 may comprise a network interface, modem, port, bus, link, transceiver, or other communication device. Communication interface 720 may be distributed among multiple communication devices. Processing system 730 may comprise a microprocessor, microcontroller, logic circuit, or other processing device. Processing system 730 may be distributed among multiple processing devices. User interface 760 may comprise a keyboard, mouse, voice recognition interface, microphone and speakers, graphical display, touch screen, or other type of user interface device. User interface 760 may be distributed among multiple interface devices. Storage system 740 may comprise a disk, tape, integrated circuit, RAM, ROM, network storage, server, or other memory function. Storage system 740 may be a computer readable medium. Storage system 740 may be distributed among multiple memory devices.

Processing system 730 retrieves and executes software 750 from storage system 740. Processing system may retrieve and store data 770. Processing system may also retrieve and store data via communication interface 720. Processing system 750 may create or modify software 750 or data 770 to achieve a tangible result. Processing system may control communication interface 720 or user interface 770 to achieve a tangible result. Processing system may retrieve and execute remotely stored software via communication interface 720.

Software 750 and remotely stored software may comprise an operating system, utilities, drivers, networking software, and other software typically executed by a computer system. Software 750 may comprise an application program, applet, firmware, or other form of machine-readable processing instructions typically executed by a computer system. When executed by processing system 730, software 750 or remotely stored software may direct computer system 700 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of controlling power, comprising:
communicating, by a first server, with a storage unit associated with a logical unit number (LUN) via at least a first I/O port and a second I/O port;
communicating, by a second server, with the storage unit associated with the LUN via at least a third I/O port and a fourth I/O port;
determining that a usage indicator associated with at least said first I/O port and said second I/O port satisfies a first usage criteria, the usage indicator based on a current I/O load and a current active I/O port bandwidth;
in response to said usage indicator satisfying said first usage criteria, determining that said first I/O port may be deactivated by ensuring that after said first I/O port is deactivated, said LUN will still have at least one data path to each of said first server and said second server; and,
deactivating said first I/O port by placing said first I/O port in a power saving mode.

2. The method of claim 1, wherein determining that said first I/O port may be deactivated is further based on a first usage indicator associated with said first I/O port and a second usage indicator associated with said second I/O port.

3. The method of claim 1, further comprising:
waiting for said first I/O port to become idle before deactivating said first I/O port.

4. The method of claim 1, wherein said first I/O port is placed in said power saving mode by instructing said first I/O port to change from a first PCI device power state to a second PCI device power state.

5. The method of claim 1, further comprising:
determining that said usage indicator satisfies a second usage criteria;
in response to said usage indicator satisfying said second usage criteria, activating said first I/O port.

6. The method of claim 5, wherein said first I/O port is placed in said power saving mode by instructing said first I/O port to change from a first PCI device power state to a second PCI device power state.

7. The method of claim 6, wherein said first I/O port is activated by instructing said first I/O port to change from said second PCI device power state to said first PCI device power state.

8. A power saving system, comprising:
a plurality of I/O ports of a plurality of controllers coupled via a plurality of paths to a plurality of external I/O devices, said plurality of I/O ports comprising a first I/O port and a second I/O port;
a multi-path manager that routes individual I/O requests to a selected one of at least said first I/O port and said second I/O port;
a power manager monitoring a total I/O bandwidth associated with said plurality of I/O ports, said power manager instructing said multi-path manager to stop routing I/O requests to said first I/O port in response to said total I/O bandwidth satisfying a bandwidth criteria and in response to determining that after said first I/O port is deactivated, each of said plurality of external I/O devices will still have at least one data path to each of said plurality of controllers; and,
an I/O port manager that, in response to said first I/O port becoming idle, instructs said first I/O port to enter a power saving mode.

9. The power saving system of claim 8, wherein said multi-path manager determines whether at least two paths of said plurality of paths to said external I/O device will still exist if said first I/O port is deactivated.

10. The power saving system of claim 8, wherein said I/O port manager instructs said first I/O port to enter a power saving mode by using a PCI device power state.

11. The power saving system of claim 8, wherein said power manager in response to said total I/O bandwidth satisfying a second bandwidth criteria, instructs said multi-path manager to route I/O requests to said first I/O port and said I/O port manager instructs said first I/O port to exit said power saving mode.

12. The power saving system of claim 8, wherein said multi-path manager selects said first I/O port to be deactivated based on based on a first usage indicator associated with said first I/O port and a second usage indicator associated with said second I/O port.

13. A computer readable medium having instructions stored thereon for controlling power that, when executed by a computer, at least instruct the computer to:
communicate, by a first server, with a storage unit associated with a logical unit number (LUN) via at least a first I/O port and a second I/O port;
communicate, by a first server, with the storage unit associated with the LUN via at least a third I/O port and a fourth I/O port;
determine that a usage indicator associated with at least said first I/O port and said second I/O port satisfies a first usage criteria, the usage indicator based on a current I/O load and a current active I/O port bandwidth;
in response to said usage indicator satisfying said first usage criteria, determine that said first I/O port may be deactivated by determining that after said first I/O port is deactivated, said LUN will still have at least one data path to each of said first server and said second server; and,
deactivate said first I/O port by placing said first I/O port in a power saving mode.

14. The computer readable medium of claim 13, wherein determining that said first I/O port may be deactivated is further based on a first usage indicator associated with said first I/O port and a second usage indicator associated with said second I/O port.

15. The computer readable medium of claim 13, wherein the computer is further instructed to:
wait for said first I/O port to become idle before deactivating said first I/O port.

16. The computer readable medium of claim 13, wherein said first I/O port is deactivated by instructing said first I/O port to change from a first PCI device power state to a second PCI device power state.

* * * * *